(12) United States Patent
Ajiki et al.

(10) Patent No.: US 7,649,679 B2
(45) Date of Patent: Jan. 19, 2010

(54) PHOTON PAIR GENERATING DEVICE

(75) Inventors: Hiroshi Ajiki, Suita (JP); Hajime Ishihara, Mino (JP)

(73) Assignees: Japan Science & Technology Agency, Saitama (JP); Public University Corporation Osaka Prefecture University, Osaka (JP)

( * ) Notice: Subject to any disclaimer, the term of this patent is extended or adjusted under 35 U.S.C. 154(b) by 0 days.

(21) Appl. No.: 12/091,381

(22) PCT Filed: Aug. 11, 2006

(86) PCT No.: PCT/JP2006/315912

§ 371 (c)(1),
(2), (4) Date: Apr. 24, 2008

(87) PCT Pub. No.: WO2007/094094

PCT Pub. Date: Aug. 23, 2007

(65) Prior Publication Data

US 2009/0114925 A1    May 7, 2009

(30) Foreign Application Priority Data

Feb. 17, 2006    (JP) .............................. 2006-041474

(51) Int. Cl.
*G02F 1/35* (2006.01)
*G02F 2/02* (2006.01)

(52) U.S. Cl. ........................................ 359/326; 372/98

(58) Field of Classification Search ......... 359/326–332; 385/122; 372/92, 98
See application file for complete search history.

(56) References Cited

U.S. PATENT DOCUMENTS

| 6,956,330 B2 * | 10/2005 | Santori et al. .......... 315/111.81 |
| 2002/0196827 A1 * | 12/2002 | Shields et al. .................. 372/45 |
| 2007/0216991 A1 | 9/2007 | Edamatsu et al. |

FOREIGN PATENT DOCUMENTS

| JP | 2001-267682 | 9/2001 |
| JP | 2005-309012 | 11/2005 |

OTHER PUBLICATIONS

Savasta S. et al., "Hyper Raman Scattering in Microcavity Quantum Wells: A Quantum Optical Process in the Strong Coupling Regime", Physica Status Solidi. A, vol. 164, No. 1, pp. 85-89, (1997).

(Continued)

*Primary Examiner*—Daniel Petkovsek
(74) *Attorney, Agent, or Firm*—Nixon & Vanderhye

(57) ABSTRACT

A photon pair generating device capable of further increasing generation efficiency of a correlation photon pair is provided, the photon pair generating device generating the correlation photon pair by a hyper-parametric scattering. A quantum well is provided in a resonator. An incident light radiated from a light source to the resonator resonates therein and becomes a particular resonator mode. The generation efficiency of the correlation photon pair by the hyper-parametric scattering in the quantum well is enhanced by disposing the quantum well in a position where electric field strength of the light becomes higher by this resonator mode.

6 Claims, 6 Drawing Sheets

OTHER PUBLICATIONS

Perea, J.I. et al., "Polarization Entanglement Visibility of Photon Pairs Emitted by a Quantum Dot Embedded in a Microcavity", Physical Review B., vol. 72, No. 3, pp. 35303-1-6, (2005).

Ajiki H. et al., "Kyoshinki QED ni yoru Motsureai Koshitsui Seisei no Keisan (Theoretical study on Generation of Entangled Photon Pair in the Cavity QED Treatment)", The Physical Society of Japan Koen Gaiyoshu, vol. 60, No. 2, pp. 587 20aPSA-25, (2005).

Edamatsu, K. et al., "Generation of Ultraviolet Entangled Photons in a Semiconductor", Nature, pp. 167-170, (Sep. 9, 2004).

Ajiki, H. et al., "Cavity Effect on Generation of Entangled-Photon Pairs", Conference on Lasers and Electro-Optics/Quantum Electronics and Laser Science Conference and Photonic Applications Systems Technologies, California, USA, 4 pages, (May 23, 2006).

International Search Report for PCT/JP2006/315912, mailed Oct. 24, 2006.

* cited by examiner

PHOTON PAIR GENERATING DEVICE

This application is the U.S. national phase of International Application No. PCT/JP2006/315912, filed 11 Aug. 2006, which designated the U.S. and claims priority to JP 2006-041474, filed 17 Feb. 2006, the entire contents of each of which are hereby incorporated by reference.

TECHNICAL FIELD

The present invention relates to a photon pair generating device that generates a quantum correlation photon pair.

BACKGROUND ART

Development of information and communications technology has been remarkable in recent years, and demand for further improvement in speed and advancement of the technology has been expanding. In connection with this, quantum information processing is known as art different from conventional information processing which deals with electric signals. Research on the quantum information processing, which was ignited by a quantum encryption protocol devised by Charles Bennet and others in 1984 (IBM) and a quantum computing algorithm devised by Peter Shore and others in 1994 (AT&T), has now been energetically advanced.

According to the quantum encryption, safety is guaranteed by physical development, in view of the Heisenberg uncertainty principle in quantum mechanics. According to the Heisenberg uncertainty principle, a state changes with monitoring; therefore, when communication is intercepted (monitored), the interception always becomes obvious. Actions such as blocking of communication can be taken in response to the interception. As such, the interception of communication is believed to be physically impossible. Furthermore, it is also impossible to reproduce particles due to the Heisenberg uncertainty principle.

Quantum teleportation is known as an important element in the quantum encryption. Quantum teleportation is a technique of moving only the quantum information of particles from one place to another. This quantum teleportation is realized when photons exchange information with each other, using photon pairs that have quantum correlation to each other (quantum correlation photon pairs). A quantum correlation photon pair has the property that quantum state of one photon determines that of the other, and this property does not depend on a distance between two photons.

Generation of quantum correlation photon pairs has been conventionally realized by parametric down conversion in which a nonlinear optical material is irradiated by high output laser. However, this has disadvantages in that (i) wavelengths of the quantum correlation photon pairs generated through this process are relatively long and (ii) it is difficult to realize a quantum correlation multi-photon state of more than three photons. In contrast, the following Non-Patent Document 1 and Patent Document 2 disclose a technique of generating correlation photon pairs having short wavelengths by using a resonance hyper-parametric scattering process of a semiconductor CuCl bulk crystal.

The generation method of the correlation photon pairs with use of the semiconductor CuCl bulk crystal has the most fundamental feature and advantages in that it is possible to generate the correlation photon pairs having shorter wavelengths, as compared to the conventional generation method. From perspective of realizing a device, however, it is more preferable to adopt a nano crystal than to adopt a bulk crystal. Interaction with light, nevertheless, will become small when the nano crystal is adopted. This causes a problem that it is difficult to generate correlation photon pairs with high efficiency.

Non-Patent Document 1: K. Edamatsu, G. Oohata, R. Shimizu, and T. Itoh: Nature, 431, 167, (2004).

Patent Document 2: Japanese Unexamined Publication of Patent Application, Tokukai 2005-309012 (published on Nov. 4, 2005).

DISCLOSURE OF INVENTION

The present invention is made in the view of the problem, and an object of the present invention is to provide a photon pair generating device that makes it possible to further improve the generation efficiency of correlation photon pairs, the photon pair generating device generating the correlation photon pairs by the hyper-parametric scattering.

In order to resolve the above problem, the photon pair generating device of the present invention is configured to include a light source that emits light and a resonator in which the light irradiated by the light source is resonated so that intensity of the light is enhanced, wherein the resonator includes a correlation photon pair generating member, which causes (i) received two photons to be exited in resonance so that an exciton molecule is generated and (ii) two photons having a quantum correlation to each other to be emitted as a correlation photon pair in response to a decay of the exciton molecule.

According to the above configuration, the correlation photon pair generating member is configured to be included in the resonator. As described above, the correlation photon pair generating member is a member generating the correlation photon pairs by the hyper-parametric scattering. Here, the resonator has a function of resonating the light irradiated by the light source inside so as to enhance the intensity of the light. By providing the correlation photon pair generating member in the resonator having such function, photons, intensity of which is enhanced more, can be provided to the correlation photon pair generating member. Thus, generation efficiency of correlation photon pair can be raised further, as compared to a case where the correlation photon pair generating member is used independently.

For a fuller understanding of the nature and advantages of the invention, reference should be made to the ensuing detailed description taken in conjunction with the accompanying drawings.

BRIEF DESCRIPTION OF DRAWINGS

In FIG. 3, a horizontal axis shows strength of interaction between the exciton and light in the resonator mode and a vertical axis shows a difference frequency of plus (+) polarization.

BEST MODE FOR CARRYING OUT THE INVENTION

One embodiment of the present invention is described below with reference to drawings.

(Configuration of Photon Pair Generating Device)

Figure 1:
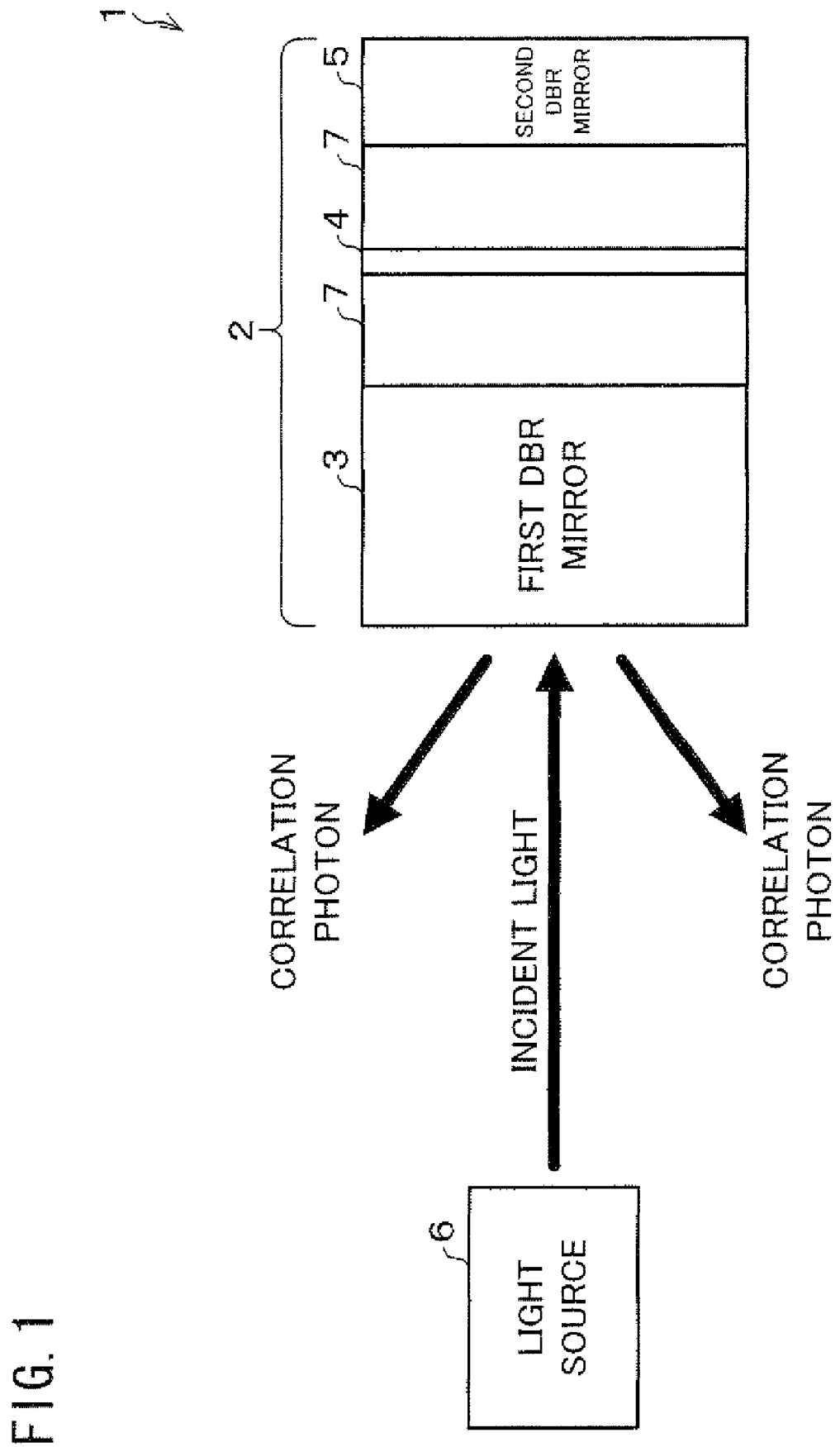
FIG. 1 is a block diagram schematically illustrating a configuration of a photon pair generating device of an embodiment in accordance with the present invention.

FIG. 1 schematically shows a configuration of a photon pair generating device 1 of the present embodiment. As illustrated in FIG. 1, the photon pair generating device 1 includes a resonator 2 and a light source 6.

The resonator 2 is irradiated by laser light, which serves as incident light, from the light source 6. Specifically, the light source 6 includes a laser light source for irradiating laser light and a ¼ wavelength plate. Vertical-Cavity Surface-Emitting Laser (VCSEL) is, for example, known as a laser light source. The Vertical-Cavity Surface-Emitting Laser emits laser light having a predetermined wavelength, predetermined pulse width, and a predetermined cyclic frequency. The ¼ wavelength plate converts, into circular polarized light, linear polarization irradiated by the laser light source.

According to the present embodiment, there are provided (i) two laser light sources each of which irradiates laser light having a different frequency, and (ii) ¼ wavelength plates provided to correspond to the two laser light sources, respectively. The circular polarized light into which the incident light is converted by one of the ¼ wavelength plates has a polarization direction reverse to that of the circular polarized light into which the incident light is converted by the other one of the ¼ wavelength plates. Accordingly, the respective polarizations of two light emitted by the light source 6 have reverse rotation directions to each other. Here, the respective polarizations of the two light having reverse rotation directions to each other are referred to as plus (+) polarization and minus (−) polarization, respectively. How frequencies of the + polarization and the −polarization are set up is described later. According to the above configuration, it is possible that the resonator 2 is irradiated by + polarization and − polarization, which have different frequencies.

Although the light source 6 is configured to irradiate + polarization and − polarization in the configuration above, it can be alternatively configured to irradiate linear polarization. Since the linear polarization has both + polarization and − polarization, correlation photon pairs can be generated even by irradiating the resonator 2 by the linear polarization. Furthermore, when providing two laser light sources having respective linear polarization whose frequencies are different from each other, it is possible that the resonator 2 is irradiated by + polarization and − polarization whose frequencies are different from each other.

The resonator 2 resonates the incident light internally, and also irradiates, in the hyper-parametric scattering process, photon pairs (correlation photon pairs) that have quantum correlation to polarization. The resonator 2 includes a first DBR (Distributed Bragg Reflector) mirror 3, a second DBR mirror 5, a quantum well 4 (correlation photon pair generating member), and resonance space regions 7.

The first and second DBR mirrors 3 and 5 are configured such that semiconductor layers, having different refractive indexes and having thickness of ¼ of an optical wavelength, are alternately stacked. Although the DBR mirrors are used as the mirrors of the resonator in the present invention, mirrors made of any material can be alternatively used as long as they can be used in the resonator.

The resonance space region 7 is provided in a region sandwiched between the first and second mirrors 3 and 5, and the quantum well 4 is provided in the resonance space domain 7. The quantum well 4 is formed of a thin film having thickness of nm order (10 nm to 100 nm), and is configured to be sandwiched between such barrier layers having a large band gap. This causes an electron to be quantized in a thickness direction, thereby results in that energy becomes discrete. The present embodiment deals with a case where a CuCl crystal having film thickness of 10 nm to 20 nm is used as the quantum well 4 but any material can be used as the quantum well 4, provided that the material is capable of generating the correlation photon pairs via the resonance hyper-parametric scattering process. The generation efficiency of correlation photon pairs becomes good when the quantum well 4 has the film thickness of 10 nm to 20 nm.

(Generation of Correlation Photon Pairs)

As described above, when the semiconductor bulk crystal is irradiated by laser light having a certain wavelength, an exciton molecule is generated in resonance due to two photons absorption. A state where an electron is removed from a valence band by irradiation of the light can be considered as a positively charged particle (electron hole). A state bound by the electron hole and the electron that is excited to a conduction band is called an exciton. The exciton molecule refers to a state where two excitons are bound.

Then, two photons emitted in different directions in a vanishing process of the exciton molecule come into a state where they have quantum correlation to polarization. This causes generation of correlation photon pairs. Correlation photon pairs (quantum correlation photon pairs) are also referred to as entangled photon pairs, and indicate photon pairs that are quantum-theoretically entangled.

Such scattering process (resonance hyper-parametric scattering process) could be produced when a semiconductor quantum well is used instead of a semiconductor bulk crystal. However, since interaction with light becomes small when the semiconductor quantum well is used, the generation efficiency of the correlation photon pairs becomes low.

Thus, the photon pair generating device 1 of the present embodiment is configured such that the quantum well 4 is provided in the resonator 2, as described above. By arranging the quantum well 4 in the resonator 2 on an appropriate condition (details are described later), generation of the correlation photon pairs in the resonance hyper-parametric scattering process can be achieved remarkably and efficiently, as compared to a configuration where the quantum well 4 is used independently.

A principle that the generation efficiency of the correlation photon pairs is enhanced by using the resonator 2 is essentially based on the fact that average electric field strength per one photon in the resonator 2 becomes very strong. Specifically, once light enters into the resonator 2, the light in the resonator 2 becomes in a specified mode due to resonance, thereby results in that the electric field strength of the light increases. Note that there are various types of light modes in the resonator 2, and there exist positions where the electric field strength becomes higher for the respective light modes. By providing the quantum well 4 in the position where the electric field strength becomes higher, it is possible to enhance the generation efficiency of the correlation photon pairs in the resonance hyper-parametric scattering process.

For example, in a case of a resonator mode having the smallest frequency among the light modes (resonator modes) in the resonator 2, the electric field strength becomes the highest near the center of the resonance space region 7. That is, it is possible to increase the generation efficiency of correlation photon pairs by providing the quantum well 4 near the center of the resonance space domain 7.

(Enhancement Rate of Generation Efficiency of Correlation Photon Pair)

Next, the following description deals with an enhancement rate indicating that, to what extent, the generation efficiency of the correlation photon pairs of the configuration where the quantum well 4 is provided in the resonator 2 is intensified as compared to the generation efficiency of the configuration where quantum well is provided independently.

When two photons enter into the quantum well 4, an exciton molecule is generated due to the two-photon resonance excitation. The exciton molecule thus generated is divided into two excitons without being subject to relaxation, and those two excitons are emitted as a correlation photon pair. The excitons and the exciton molecule disappear, after being subject to various processes due to relaxation, in addition to emitting the correlation photon pair. A process in which excitons and exciton molecules disappear and lattice oscillators (phonon) are induced is an example of a process in which no correlation photon pair is emitted. A relaxation constant is defined by an inverse of a time period required for a transition of exciton or exciton molecule transforming into another state, in "the process in which no correlation photon pair is emitted".

The generation efficiency of the correlation photon pairs is determined by relative amount of energy between "interaction between light and a substance system (hereafter simply referred to as interaction)" and "a relaxation constant." In a case where "the relaxation constant" is sufficiently larger than "the interaction," the generation efficiency becomes larger as the relaxation constant gets smaller. However, in a case where "the relaxation constant" is made smaller and becomes sufficiently smaller than the "interaction," the generation efficiency becomes almost saturated.

The following description deals with a case where "the relaxation constant" is sufficiently larger than "the interaction" of the case where the quantum well is used independently. Even in a such case, the electric field strength of light in the quantum well 4 can be larger by arranging the quantum well 4 in the resonator 2, as compared to the case where quantum well is used independently. This allows "the interaction" to be sufficiently larger than "the relaxation constant." That is, the generation efficiency of the correlation photon pairs becomes higher in the configuration where the quantum well 4 is provided in the resonator 2 than in the configuration where the quantum well is used independently.

On the other hand, when "the relaxation constant" is smaller than "the interaction" of the configuration where the quantum well is used independently, relatively large generation efficiency can be obtained even if the quantum well 4 is used independently (even if the quantum well 4 is not provided in the resonator 2). Thus, the generation efficiency is slightly improved even if the quantum well 4 is provided in the resonator 2.

Therefore, the enhancement rate of the generation efficiency of the correlation photon pairs depends on the relaxation constant of the quantum well 4, and the enhancement rate becomes larger as the relaxation rate gets larger.

Figure 2A:
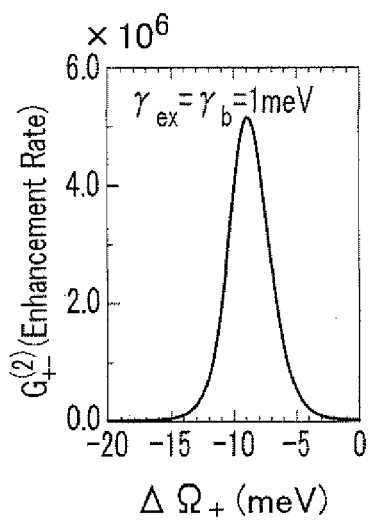
FIG. 2(a) is a graph showing an enhancement rate in a case where an exciton and an exciton molecule have a relaxation constant of 1 meV.
Figure 2B:
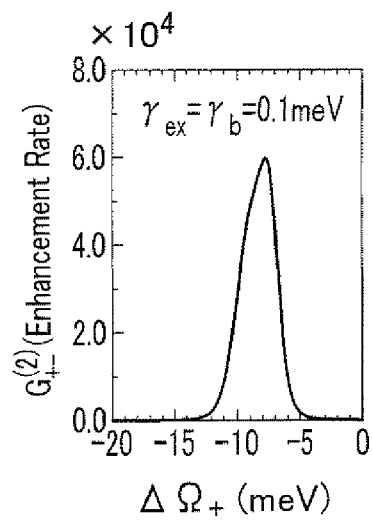
FIG. 2(b) is a graph showing an enhancement rate in a case where the exciton and the exciton molecule have a relaxation constant of 0.1 meV.
Figure 2C:
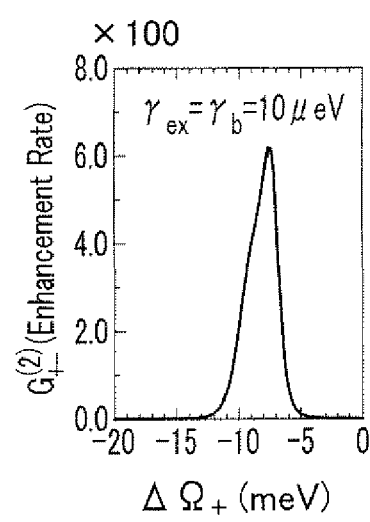
FIG. 2(c) is a graph showing an enhancement rate in a case where the exciton and the exciton molecule have a relaxation constant of 10 μeV.

FIGS. 2(a) to 2(c) are graphs showing enhancement rates in cases where the exciton and the exciton molecule have relaxation constants $\gamma_{ex}$ and $\gamma_b$ of 1 meV, 0.1 meV, and 10 μeV, respectively. Preconditions of those graphs are as follows. First, +polarization and −polarization are vertically incident on a surface of the quantum well 4. Here, the frequency of the −polarization is identical to the frequency of a resonator polarization (which shows a mode where the resonator mode and the excitons in the quantum well are combined) having an in-plane wavenumber vector of 0. Exciton resonance energy is 3.2022 eV, bound energy of exciton molecule is 30 meV, interaction between the exciton and the light in the resonator mode is 22 meV, interaction between exciton molecule and the light in the resonator mode is 1 meV, and a Q value of the resonator 2 is 1000. The Q value is a value indicating a degree of frequency distribution and is expressed by an equation that $Q=\omega_c/\Gamma$ ($\Gamma$: full width at half maximum (frequency) at a peak of transmission spectrum of the resonator 2, $\omega_c$: a frequency of the peak of the transmission spectrum). The vertical axes of the graphs show the enhancement rates, respectively, while the horizontal axes of the graphs show a difference frequency $\Delta\Omega_+$ of +polarization. The difference frequency $\Delta\Omega_+$ is defined by $\Delta\Omega_+ = \omega_+ - \omega_0$ ($\omega_+$: a frequency of +polarization, $\omega_0$: a frequency of the resonator mode).

As shown in these graphs, when exciton and exciton molecule have a relaxation constant of 1 meV, the enhancement rate reaches 1 million times, yet when exciton and exciton molecule have a relaxation constant of 10 μeV, the enhancement rate is about 600 times. Consequently, when exciton and exciton molecule have a relaxation constant of sufficiently small, the enhancement rate of quantum correlation photon pair generation by the resonator 2 is relatively small. However, even when the relaxation constants are small in this way, its enhancement rate is still large. Therefore, particularly in a case where the photon pair generating device 1 is operated at a room temperature, the effect achieved by the configuration where the quantum well 4 is provided in the resonator 2 is significant (Optimization Conditions for Correlation Photon Pair Generation)

The following description deals with optimization conditions for optimizing the generation efficiency of correlation photon pairs in the configuration where the quantum well 4 is provided in the resonator 2. The optimization conditions mainly include the following two points.

(1) Of the incident light of +polarization and the incident light of −polarization, either of the polarizations has a frequency made equal to the frequency of an energy level of the resonator polarization of the resonator 2.

(2) (i) The frequency, which is not equal to the frequency of the resonator polarization, of the other of the polarizations out of the incident light of +polarization and the incident light of − polarization and (ii) "the interaction between light in the resonator and the substance system satisfy such conditions that "the component of the exciton molecule" and "the component of the light in the resonator mode" in the two-particle excitation state exist by substantially the same amount.

Details of two conditions above are described below. In a case where correlation photon pairs are generated in the resonance hyper-parametric scattering process, it is indispensable that exciton molecules are generated first. However, according to the framework of the cavity QED (Quantum Electrodynamics), there is a case that an excitation state cannot be described solely as an excitation molecule state in the system of the resonator 2 embedded with the quantum well 4 as a thin film. In fact, when two photons of + polarization and − polarization enter into the resonator 2 (two-particle excitation state), the eigenstate of the resonator system is expressed by superposition of four states, which are: $\phi1$ (0 photon, 1 exciton molecule), $\phi2$ (1 photon of +polarization, 1 exciton of −polarization), $\phi3$ (1 photon of −polarization, 1 exciton of +polarization), and $\phi4$ (1 exciton of −polarization and +polarization; the substance system is in a ground state).

Another important point in generation of correlation photon pairs is that the two-particle excitation state includes a photon state in the resonator (that is, states of $\phi2$, $\phi3$, and $\phi4$). This condition is necessary for generated correlation photon pairs to go out of the resonator 2.

As is clear from above, it is necessary that the state $\phi1$ is realized since it is necessary that the exciton molecules are generated, and it is necessary that the states $\phi2$, $\phi3$, and $\phi4$ are realized since it is necessary that the two-particle excitation state includes the photon states in the resonator. Thus, if the two-particle excitation state is in a state obtained by superposing (i) a state ($\phi1$) including an exciton molecule and (ii) states ($\phi2$, $\phi3$, and $\phi4$) including the photons in the resonator modes, each of the states having substantially the same weight, then the correlation photon pairs will be generated with high efficiency. In the condition (2) above, that "'the component of the exciton molecule' and 'the component of the light in the resonator mode' in the two-particle excitation state exist by substantially the same amount" indicates that "a transition probability of having 1 exciton molecule" is substantially the same as "the sum of a transition probability of the combination of 1 exciton and 1 incident photon (elements of polarization are conservation of angular momentum) and a transition probability of the combination of 2 photons and 0 incident photon."

The condition (2) deals with a case where "the component of the exciton molecule and the component of the light in the resonator mode in the two-particle excitation state" exist by substantially the same amount. However, it is possible to improve the generation efficiency of the correlation photon pairs, provided that both "the component of the exciton molecule and the component of the light in the resonator mode in the two-particle excitation state" exist irrespective of their amount. Furthermore, when either "the component of the exciton molecule or the component of the light in the resonator mode in the two-particle excitation state" is not less than 10%, it is possible to sufficiently improve the generation efficiency of the correlation photon pairs.

(Design Based on Optimization Conditions)

The following description deals with designing of the photon pair generating device 1 based on the optimization conditions. First, based on the condition (1), the light source 6 controls its light emission such that the frequency of either + polarization or −polarization of the incident light (e.g., − polarization) is made equal to the frequency of an upper or lower branch of the resonator polarization having an in-plane wavenumber vector of 0.

Here, the frequency of the lower branch of the resonator polarization having the in-plane wavenumber vector of 0 is calculated by $\omega_0 - g_{ex}$ (where $\omega_0$ is a frequency of the resonator mode and $g_{ex}$, is interaction between the exciton and the light in the resonator mode, respectively). In addition, the frequency of the upper branch of the resonator polarization having the in-plane wavenumber vector of 0 is calculated by $\omega_0 + g_{ex}$. Consequently, when the frequency of the −polarization is made equal to the frequency of the lower branch of the resonator polarization having an in-plane wavenumber vector of 0, the difference frequency $\Delta\Omega_- (= \omega_- - \omega_0)$ of the −polarization should be made equal to $- g_{ex}$ (i.e., $\Delta\Omega_- = -g_{ex}$).

Like the above, by making frequencies of photons of the incident light equal to the frequencies of branches on energy levels of the resonator polarization, it is possible that photons get into the resonator 2 almost completely. That is, it is possible to improve the efficiency of causing photons of the incident light to be in a resonant state in the resonator 2.

Figure 3:
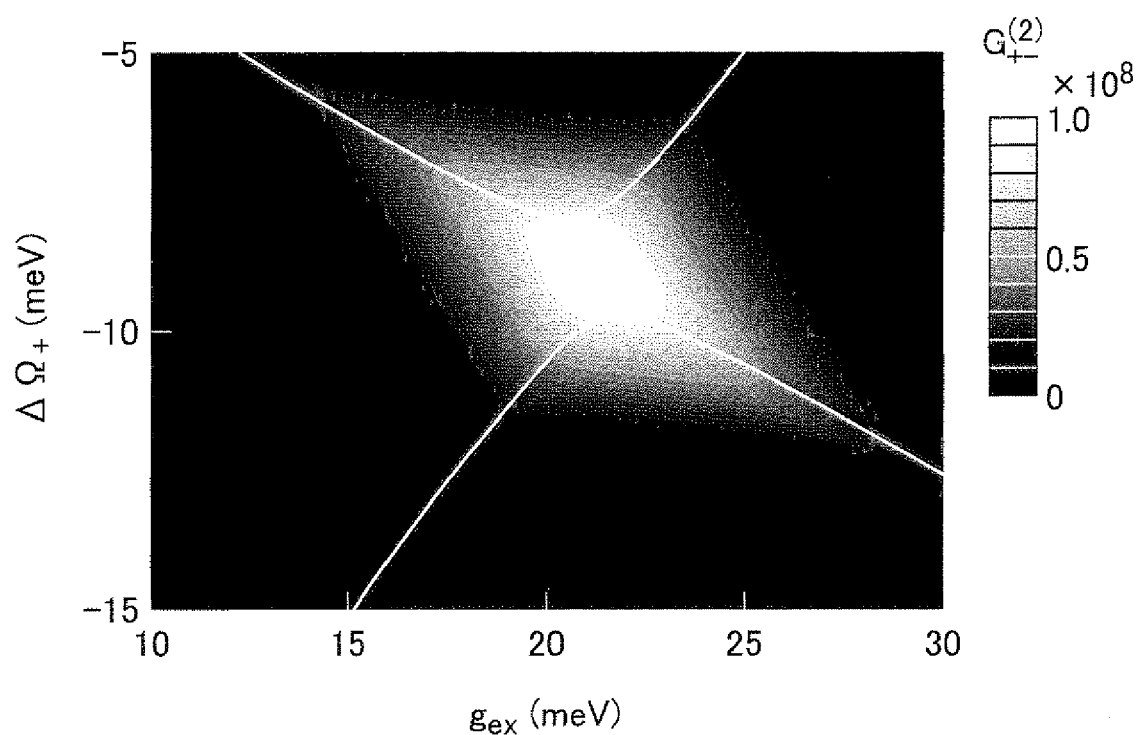
FIG. 3 is graph showing calculated values of generation efficiency of the correlation photon pair with a gray scale, in a case that a frequency of minus (−) polarization is made equal to a frequency of a lower branch of a resonator polarization having an in-plane wavenumber vector of 0.

FIG. 3 is a graph showing calculated values of generation efficiency $G_{+-}$ of the correlation photon pairs in a gray scale when the frequency of −polarization is made equal to the frequency of an lower branch of the resonator polarization having an in-plane wavenumber vector of 0. In FIG. 3, the horizontal axis shows strength ($g_{ex}$) of interaction between the exciton and the light in the resonator mode, and the vertical axis shows the difference frequency $\Delta\Omega_+$ of the +polarization. Here, it is possible to change the strength ($g_{ex}$) of the interaction between the exciton and the light in the resonator mode by changing the thickness of the quantum well 4.

Preconditions of the graph of FIG. 3 are as follows. First, the light of +polarization and −polarization is vertically incident on surfaces of the quantum well 4. The exciton resonance energy is 3.2022 eV; the bound energy of exciton molecule is 30 meV; the interaction between the exciton molecule and the light in the resonator mode is 1 meV, the relaxation constants of the exciton and the exciton molecule are 1 meV; and Q value of the resonator 2 is 1000. Furthermore, the value of the production efficiency $G_{+-}$ is normalized by the case where a quantum well (thin film) (i) has oscillator strength corresponding to $g_{ex}$=10 meV when a resonator 2 is provided and (ii) is not embedded in the resonator 2.

A relation between $\Delta\Omega_+$ and g ex, which is necessary for photons to be excited to the two-particle excitation state, is depicted with two curves in FIG. 3. The two-particle excitation state is expressed by superposing the four states, i.e., $\phi1$, $\phi2$, $\phi3$, and $\phi4$. Thus, there are four conditions required for photons to be excited to the two-particle excitation state. However, two conditions out of the four conditions are not covered in the range shown by FIG. 3, and in case of such two conditions, the generation efficiency of the correlation photon pairs is relatively small. As such, FIG. 3 merely shows two curves as the condition required for photons to be excited to the two-particle excitation state, and solely these conditions should be considered.

As described above, in order to generate correlation photon pairs, the two-particle excitation state has to include both "the component of the exciton molecules" and "the component of the light in the resonator mode." That is, these two components exist by substantially the same amount in a region where the distance between the two curves becomes the closest in FIG. 3. In such a region, the generation efficiency of the correlation photon pairs becomes the most suitable. FIG. 3 shows that the distance between the two curves becomes the closest at the optimal point defined by $g_{ex}$=22 meV and $\Delta\Omega_+$=−9 meV.

Figure 4A:
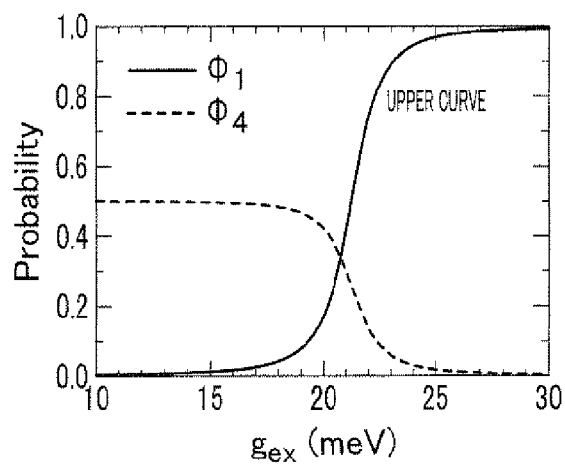
FIG. 4(a) is a graph showing existing probability of components of a state (φ1) and a state (φ4) that are calculated along an upper curve of FIG. 3.
Figure 4B:
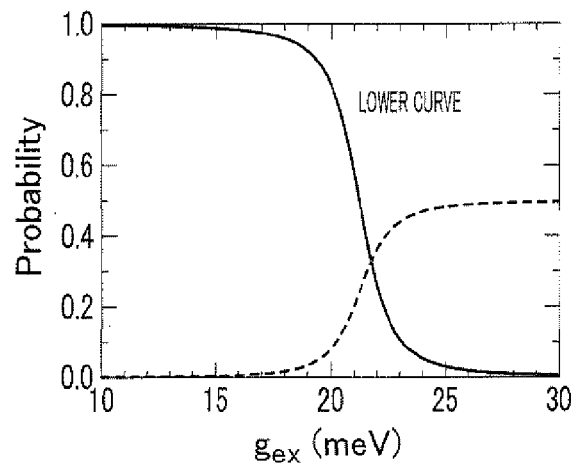
FIG. 4(b) is a graph showing existing probability of components of a state (φ1) and a state (φ4) that are calculated along a lower curve of FIG. 3.

Each of the states ($\phi1$, $\phi2$, $\phi3$, and $\phi4$) can be found by calculating the eigenstates along the two curves of FIG. 3. This calculation shows that the two-particle excitation state at the optimal point described above is a state in which the state ($\phi1$) including exciton molecules and the states ($\phi2$, $\phi3$, and $\phi4$) including the resonator mode photons are superposed so as to have substantially the same weight. FIGS. 4(a) and 4(b) show, as examples of the above calculation, existing probabilities of the components of the two states ($\phi1$ and $\phi4$), which probabilities are calculated along the upper and lower curves of FIG. 3, respectively.

Correlation photon pairs can be generated with high efficiency by designing the resonator 2 that is embedded with the quantum well 4 and satisfies conditions described above.

Here, length L of a region in the resonator 2 within which region the light is kept (in case of the configuration illustrated by FIG. 1, parameters to be designed include a length from the interface between the DBR mirror 2 and the resonance space domain 7 to the interface between the DBR mirror 5 and the resonance space domain 7), a thickness d of the quantum well 4, and the frequencies $\omega_+$ and $\omega_-$ of the incident light.

L is designed such that energy of the exciton is equal to energy of the minimum resonator mode. Specifically, the length L is calculated by the following equation (1).

$$L = \frac{c\pi}{\omega_0}\sqrt{\varepsilon_c} \qquad (1)$$

In the above equation (1), $\epsilon_c$ indicates a background dielectric constant of a region within which the light is kept.

As described above, the thickness d of the quantum well 4 is a parameter causing a change in the strength ($g_{ex}$) of the interaction between the exciton and the light in the resonator mode. Specifically, the thickness d is calculated by the following equation (2), specifically.

$$d = \frac{\pi^2}{8}\left(\frac{g_{ex}}{\omega_0}\right)^2 \frac{hc\varepsilon_c^{3/2}}{2\varepsilon_\omega \Delta_{LT}} \qquad (2)$$

In the above equation (2), h indicates Planck's constant, c indicates a velocity of light, $\epsilon_\omega$ indicates a background dielectric constant of the quantum well 4, and $\Delta_{LT}$ indicates energy for vertically and horizontally splitting the exciton.

As described above, the frequencies $\omega_+$ and $\omega_-$ of the incident light satisfies such conditions that the frequency of either the + polarization or − polarization is made equal to the frequency of the lower or upper branch of the resonator polarization having the in-plane wavenumber vector of 0 while the frequency of the other polarization is arranged such that "the component of the exciton molecule" and "the component of the light in the resonator mode" in the two-particle excitation state exist by substantially the same amount.

Energy of the interaction $g_b$ between the exciton molecule and the light in the resonator mode is required when calculating the energy of the two-particle excitation state. In FIG. 3, the energy of the interaction $g_b$ is set to 1 meV when calculating the two-particle excitation state. Since it is difficult to evaluate the interaction $g_b$, it is practical to determine it through an experiment.

(Another Embodiment of Resonator)

The quantum well 4 is provided in the resonator 2 according to the configuration illustrated by FIG. 1. Note however that it is also possible to efficiently generate correlation photon pairs based on a configuration where a quantum dot 11 (correlation photon pair generating member) is provided instead of the quantum well 4. In a case of using the quantum dots 11, the photon generating device 1 can be similarly designed by replacing the "frequency of the resonator polarization" with the "frequency of a level which has been subject to Rabi splitting." Rabi splitting refers to a level splitting of a coupling mode realized by the resonator mode and an exciton in the quantum dot.

Figure 5:
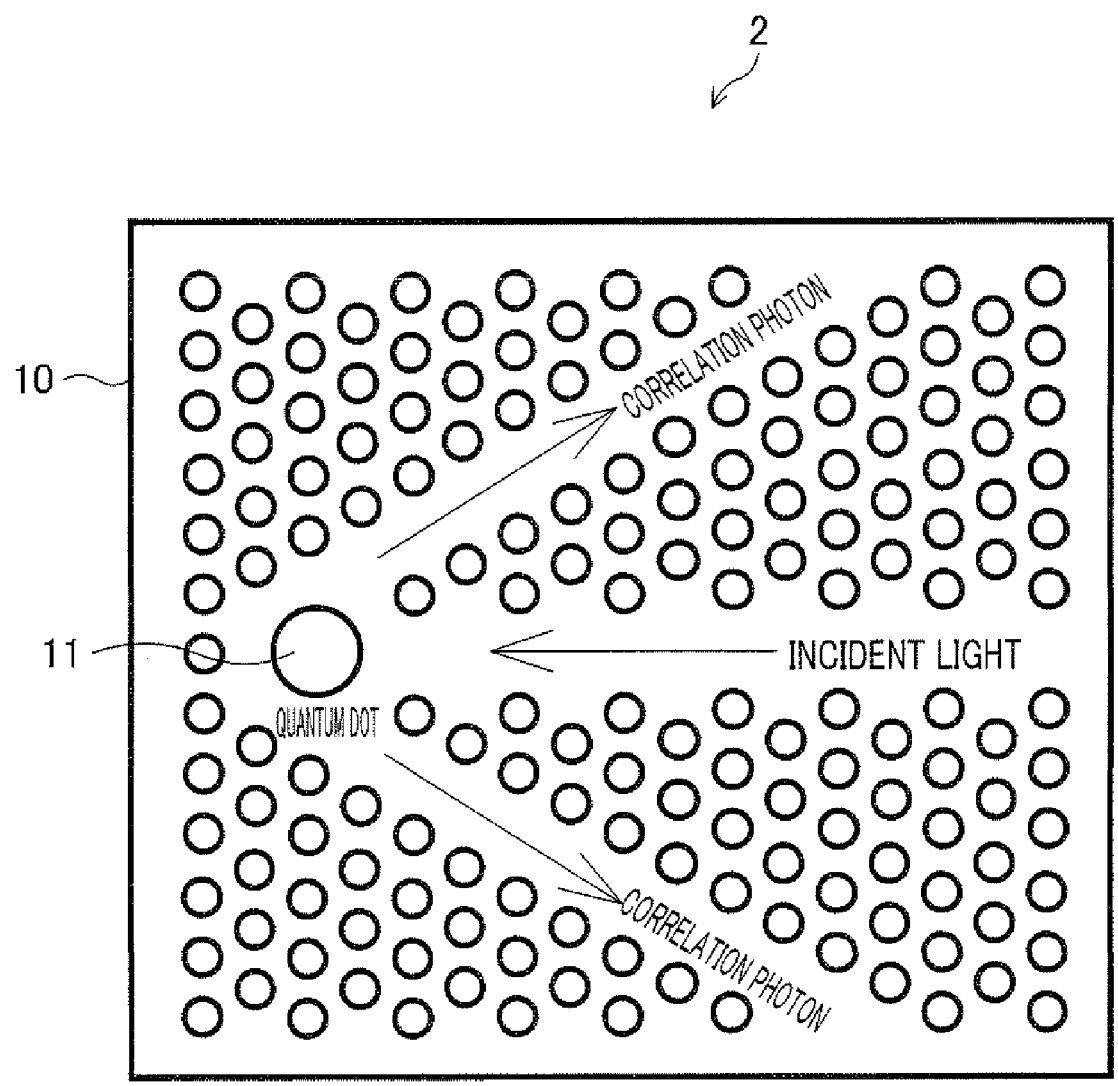
FIG. 5 is a view showing an exemplary configuration of a resonator including a two-dimensional photonic crystal.

FIG. 5 shows, as a configuration provided with a quantum dot 11, an example configuration of a resonator 2 including a two-dimensional photonic crystal 10. The two-dimensional photonic crystal refers to a structure in which fine holes (having an order of hundreds nm) are regularly formed on a tabular substrate. It is known that a line defect acts as a light guide if the line defect is provided on the two-dimensional photonic crystal 10, and that the two-dimensional photonic crystal 10 acts as a resonator if a point defect is provided. When a quantum dot 11 is embedded in a point defect and line defects are provided in three directions so as to act as light guides around the quantum dot 11, light entered via one of the line defects causes a correlation photon pair to be emitted from each of the remaining two line defects.

Figure 6:
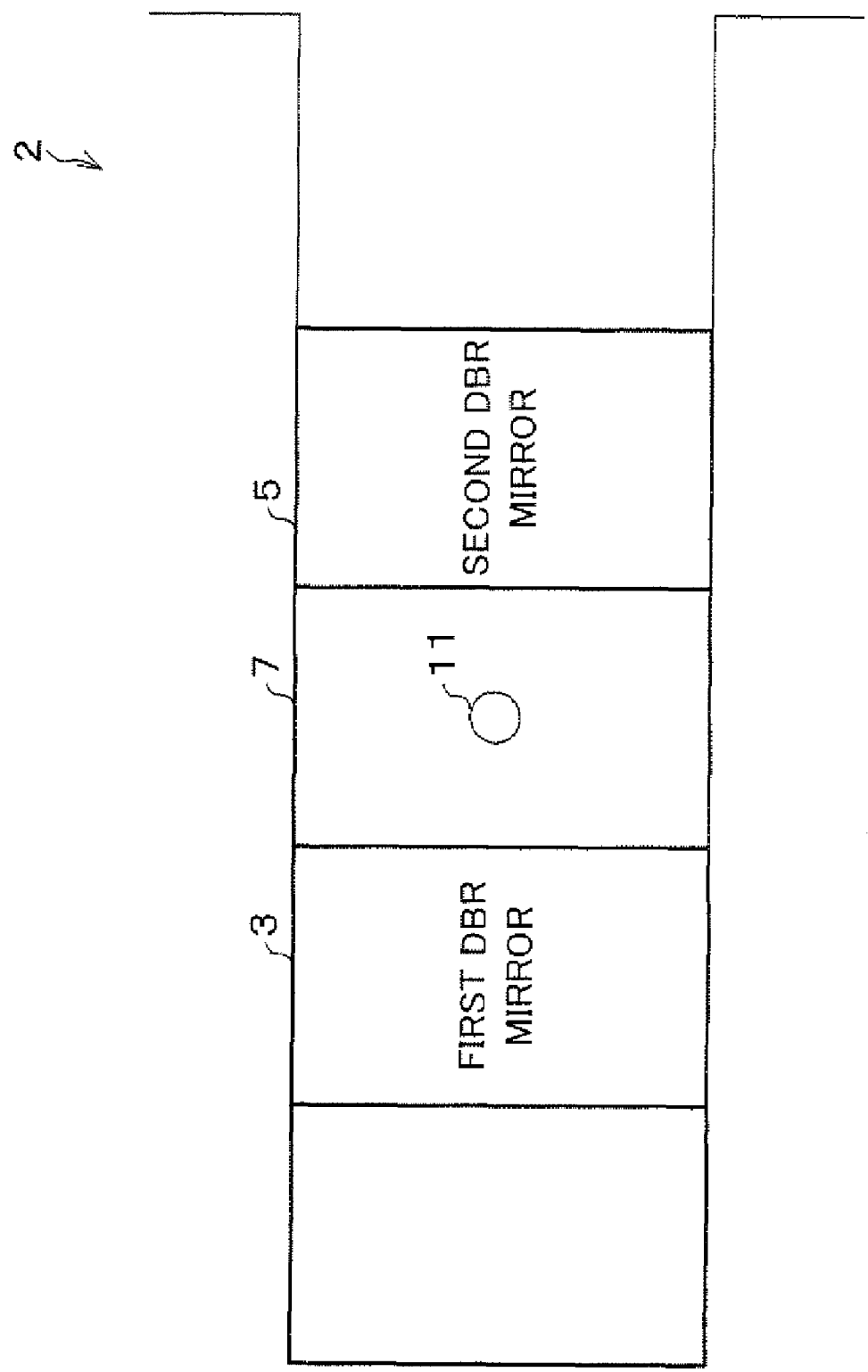
FIG. 6 is view showing an exemplary configuration of a resonator including a quantum dot, which is configured so as to have a configuration referred to as a resonator pillar.

Furthermore, the resonator 2 including the quantum dots 11 can be configured so as to have a configuration referred to as a resonator pillar, which is illustrated by FIG. 6. It is possible to realize a resonator 2 having an excellent generation efficiency of the correlation photon pairs, by (i) providing, as FIG. 6 illustrates, a first DBR mirror 3, a resonance space domain 7, and a second DBR mirror 5 in this order in the resonator pillar and (ii) providing a quantum dot 11 near the center of a resonance space domain 7.

As described above, the photon pair generating device of the present invention includes the resonator in which the light irradiated by the light source is resonated so that intensity of the light is enhanced, wherein the resonator includes a correlation photon pair generating member. Thus, generation efficiency of correlation photon pair can be raised further, as compared to a case where the correlation photon pair generating member is used independently.

In addition, the photon pair generating device of the present invention is preferably configured such that the correlation photon pair generating member can be the quantum well or the quantum dots in the above configuration.

According to the above configuration, the correlation photon pair generating member is formed by a nano crystal such as the quantum well, quantum dots, or the like; therefore, the photon pair generating device can be formed by a fine configuration of a nano order. Accordingly, in a case that the photon pair generating device formed by the nano order is used, for example, for a quantum computer applying the correlation photon pairs, high integration can be realized.

The quantum well is a two-dimensional structural object, which is formed of a semiconductor atom, a metal atom, an organic molecule, and the like and has thickness of about 10 to 100 nm. The quantum dot is an aggregated structural object, which is formed of a semiconductor atom, a metal atom, an organic molecule, and the like and has a size of about 10 to 100 nm square.

The correlation photon generating member may be formed of quantum wire, which is formed of a semiconductor atom, a metal atom, an organic molecule, and the like and has a one-dimensional configuration having thickness of about 10 to 100 nm, In addition, the photon pair generating device of the present invention is preferably configured such that, in the above configuration, the resonator is irradiated by the first photon and the second photon from the light source, wherein the first photon and the second photon, having reverse polarization rotation directions to each other, have different frequencies from each other.

According to the above configuration, it is possible to irradiate the resonator by the first photon and the second photon, wherein the first photon and the second photon, having reverse polarization rotation directions to each other, have different frequencies from each other. Thus, frequencies of the first and second photons can be independently set up such that the generation efficiency of the correlation photon pairs is increased.

Furthermore, the photon pair generating device of the present invention is preferably configured such that the frequency of the first photon is made to be equal to, by the light source, the frequency of the energy level in the mode where the resonator mode is bound with the exciton in the correlation photon pair generating member.

According to the above configuration, it is possible that photons get into the resonator almost completely. That is, it is possible to improve the efficiency of causing photons of the incident light to be in a resonant state in the resonator.

Besides, the photon pair generating device of the present invention is preferably configured such that the frequency of the second photons is set by the light source such that the component of the exciton molecule and the component of the light in the resonator mode in the two-particle excitation state exist in the correlation photon pair generating member.

According to the above configuration, the two-particle excitation state is the state in which the state including exciton molecule and the states including the resonator mode photons are superposed. By arranging the two-particle excitation state in such state, it is possible to improve the generation efficiency of the correlation photon pairs.

Moreover, the photon pair generating device of the present invention is preferably configured such that, in the above configuration, the correlation photon pair generating member has a size so that the component of the exciton molecule and the component of the light in the resonator mode in the two-particle excitation state exist in the correlation photon pair generating member. According to the above configuration, the two-particle excitation state is the state in which the state including exciton molecule and the states including the resonator mode photons are superposed, as in the case above. By arranging the two-particle excitation state in such state, it is possible to improve the generation efficiency of the correlation photon pairs.

Moreover, the photon pair generating device of the present invention is preferably configured such that, in the above configuration, the correlation photon pair generating member is provided so that electric field strength becomes higher in accordance with the light mode in the resonator.

According to the above configuration, it is possible to further increase the generation efficiency of the correlation photon pairs, by providing the correlation photon pair generating member in the position where the electric field strength becomes higher in the resonator.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

POTENTIALITY OF INDUSTRIAL APPLICABILITY

The present invention allows a photon pair having quantum correlation to polarization to be generated with high efficiency. The use of such correlation photon pairs allows the present invention to be applied to quantum information and communications technology such as quantum encryption utilizing quantum teleportation.

The invention claimed is:

1. A photon pair generating device, comprising:
   a light source that emits a first light and a second light having different frequencies with reverse polarization rotation directions to each other;
   a resonator which includes a correlation photon pair generating member; wherein
   the resonator is irradiated by a first photon from the first light source and a second photon from the second light source, the first photon and the second photon, with reverse polarization rotation directions to each other, have different frequencies from each other; and
   the resonator is provided to resonate the irradiated first and second photons so that the intensity of the light is enhanced, wherein
   the correlation photon pair generating member causes (i) the received first and second photons to exit the resonator in resonance so that an exciton molecule is generated and (ii) a third photon and a fourth photon having a quantum correlation to each other to be emitted as a correlation photon pair in response to a decay of the exciton molecule.

2. The photon pair generating device as set forth in claim 1, wherein the correlation photon pair generating member is a quantum well or a quantum dot.

3. The photon pair generating device as set forth in claim 1, wherein the frequency of the first photon is made to be equal to, by the light source, a frequency of an energy level in a mode where a resonator mode is bound with an exciton in the correlation photon pair generating member.

4. The photon pair generating device as set forth in claim 1, wherein the frequency of the second photon is set by the light source such that a component of the exciton molecule and a component of light in a resonator mode in a two-particle excitation state exists in the correlation photon pair generating member.

5. The photon pair generating device as set forth in claim 1, wherein the correlation photon pair generating member has a size so that a component of the exciton molecule in a two-particle excitation state and a component of light in a resonator mode in a two-particle excitation state exists in the correlation photon pair generating member.

6. The photon pair generating device as set forth in claim 1, wherein the correlation photon pair generating member is provided in a position where electric field strength becomes higher in accordance with a light mode in the resonator.

* * * * *